United States Patent
Bamdhamravuri et al.

(10) Patent No.: US 11,620,231 B2
(45) Date of Patent: Apr. 4, 2023

(54) LATERAL PERSISTENCE DIRECTORY STATES

(71) Applicant: International Business Machines Corporation, Armonk, NY (US)

(72) Inventors: Ram Sai Manoj Bamdhamravuri, Boston, MA (US); Craig R. Walters, Highland, NY (US); Christian Jacobi, West Park, NY (US); Timothy Bronson, Round Rock, TX (US); Gregory William Alexander, Pflugerville, TX (US); Hieu T. Huynh, Austin, TX (US); Robert J. Sonnelitter, III, Bedford Hills, NY (US); Jason D. Kohl, Austin, TX (US); Deanna P. D. Berger, Hyde Park, NY (US); Richard Joseph Branciforte, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/407,248

(22) Filed: Aug. 20, 2021

(65) Prior Publication Data
US 2023/0054424 A1  Feb. 23, 2023

(51) Int. Cl.
*G06F 12/08* (2016.01)
*G06F 12/0891* (2016.01)
(Continued)

(52) U.S. Cl.
CPC ...... *G06F 12/0891* (2013.01); *G06F 12/0895* (2013.01); *G06F 12/123* (2013.01)

(58) Field of Classification Search
CPC . G06F 12/0891; G06F 12/0895; G06F 12/123
See application file for complete search history.

(56) References Cited

U.S. PATENT DOCUMENTS

| 8,225,045 B2 | 7/2012 | Guthrie et al. |
| 8,327,073 B2 | 12/2012 | Guthrie et al. |

(Continued)

FOREIGN PATENT DOCUMENTS

| CN | 107368435 A | 11/2017 | |
| WO | WO-2014018025 A2 * | 1/2014 | ......... G06F 12/0806 |

OTHER PUBLICATIONS

Abraham, "Proceedings of Data Mining 2009," IADIS Multi Conference on Computer Science and Information Systems, Jun. 18-20, 2009, 216 pages.

(Continued)

*Primary Examiner* — Pierre Michel Bataille
(74) *Attorney, Agent, or Firm* — Cantor Colburn LLP; Jeffrey Ingalls

(57) ABSTRACT

Aspects of the invention include defining one or more processor units having a plurality of caches, each processor unit comprising a processor having at least one cache, and wherein each of the one or more processor units are coupled together by an interconnect fabric, for each of the plurality of caches, arranging a plurality of cache lines into one or more congruence classes, each congruence class comprises a chronology vector, arranging each cache in the plurality of caches into a cluster of caches based on a plurality of scope domains, determining a first cache line to evict based on the chronology vector, and determining a target cache for installing the first cache line based on a scope of the first cache line and a saturation metric associated with the target cache, wherein the scope of the first cache line is determined based on lateral persistence tag bits.

25 Claims, 6 Drawing Sheets

(51) Int. Cl.
*G06F 12/123* (2016.01)
*G06F 12/0895* (2016.01)

(56) References Cited

U.S. PATENT DOCUMENTS

| | | | |
|---|---|---|---|
| 8,806,148 | B2 | 8/2014 | Guthrie et al. |
| 9,189,403 | B2 | 11/2015 | Guthrie et al. |
| 9,753,862 | B1 | 9/2017 | Drerup et al. |
| 10,007,614 | B2* | 6/2018 | Wang ............... G06F 11/3471 |
| 10,120,809 | B2 | 11/2018 | Arellano et al. |
| 10,572,385 | B2 | 2/2020 | Bronson et al. |
| 10,628,313 | B2 | 4/2020 | Blake et al. |
| 10,628,314 | B2 | 4/2020 | Blake et al. |
| 11,487,672 | B1 | 11/2022 | Rhee et al. |
| 2007/0226423 | A1 | 9/2007 | Arimilli et al. |
| 2010/0235577 | A1 | 9/2010 | Guthrie et al. |
| 2011/0161589 | A1 | 6/2011 | Guthrie et al. |
| 2014/0019677 | A1* | 1/2014 | Chang ............... G06F 12/0804 711/143 |
| 2015/0309944 | A1 | 10/2015 | Sadoughi-Yarandi et al. |
| 2017/0262370 | A1 | 9/2017 | Kapoor |
| 2018/0101474 | A1 | 4/2018 | Bronson et al. |
| 2019/0042439 | A1* | 2/2019 | Drerup ............... G06F 12/0893 |
| 2021/0065798 | A1* | 3/2021 | Pawlowski ......... G06F 12/1036 |

OTHER PUBLICATIONS

Anonymous, "A Backward Compatible, Efficient Use of Broadcast Bandwidth When Simulcasting a Digital Television Channel in Two Related Resolutions by Use of Hierarchical Modulation and Common Chroma Components," IP.com No. IPCOM000238101D, Aug. 1, 2014, 4 pages.

Anonymous, "Bit Map Based FIFO Queue for High Performance, Low Latency Environments," IP.com No. IPCOM000255666D, Oct. 8, 2018, 4 pages.

Anonymous, "Hybrid Cache Eviction Policy for Near Caches in Spatially Distributed Cache Platforms," IP.com No. IPCOM000234682D, Jan. 28, 2014, 4 pages.

Anonymous, "Method and Apparatus for Cooperative State Prefetching in Clustered Shared Memory Multiprocessor Systems with Region Coherence Arrays," IP.com No. IPCOM000180817D, Mar. 17, 2009, 7 pages.

Anonymous, "Transparent Persistent Configuration Caching," IP.com No. IPCOM000249253D, Feb. 14, 2017, 4 pages.

Chang, "Cooperative Caching for Chip Multiprocessors," University of Wisconsin—Madison, Computer Sciences, 2007, 160 pages.

Dahlin et al., "Cooperative Caching: Using Remote Client Memory to Improve File System Performance," Proceedings of the First Symposium on Operating Systems Design and Implementation (OSDI), 1994, pp. 1-14.

Dougall, "Context-based Cache Filing from Peer Caches," IP.com No. IPCOM000251349D, Oct. 30, 2017, 8 pages.

Gibeling et al., "Using ChipScope," Feb. 2009, 4 pages.

IBM: List of IBM Patents or Patent Applications Treated as Related (Appendix P); Date Filed: Aug. 20, 2021; 2 pages.

Kalnis et al., "An Adaptive Peer-to-Peer Network for Distributed Caching of OLAP Results," SIGMOD '02: Proceedings of the 2002 ACM SIGMOD International Conference on Management of Data, Jun. 4-6, 2002, 12 pages.

Rhee et al., "Multiple Copy Scoping Bits for Cache Memory," U.S. Appl. No. 17/407,228, filed Aug. 20, 2021.

International Search Report and Written Opinion for International Application No. PCT/EP2022/072750; International Filing Date: Aug. 15, 2022; dated Dec. 9, 2022, 10 pages.

International Search Report; International Application No. PCT/EP2022/071789; International Filing Date: Mar. 8, 2022; dated Dec. 12, 2022; 17 pages.

Ren Xiaowei et al; "HMG: Extending Cache Coherence Protocols Across Modern Hierarchical Multi-GPU Systems" 2020 IEEE International Symposium on High Performance Comuputer Architecture (HPCA), Feb, 22, 2020, pp. 582-583.

Dyer Rolan et al; "Adaptive Set-Granular Cooperative Caching;" High Performance Computer Architecture, 2012 IEEE 18th International Symposium On; pp. 1-12.

* cited by examiner

LATERAL PERSISTENCE DIRECTORY STATES

BACKGROUND

The present invention generally relates to data processing, and more specifically, to lateral persistence director states in symmetric multiprocessing computers.

Contemporary high-performance computer systems are typically implemented as multi-node, symmetric multiprocessing ('SMP') computers with many compute nodes. SMP is a multi-processor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which may have at least some local memory, at least some of which is accelerated with cache memory. The cache memory can be local to each processor, local to a compute node shared across more than one processor, or shared across nodes.

SUMMARY

Embodiments of the present invention are directed to methods for lateral cache persistence. A non-limiting example computer-implemented method includes defining one or more processor units having a plurality of caches, wherein each processor unit comprises a processor having at least one cache from the plurality of caches, and wherein each of the one or more processor units are coupled together by an interconnect fabric, for each of the plurality of caches, arranging a plurality of cache lines into one or more congruence classes, each congruence class in the one or more congruence classes comprises a chronology vector, arranging each cache in the plurality of caches into a cluster of caches based on a plurality of scope domains, determining a first cache line to evict based on the chronology vector for the first cache line, and determining a target cache for installing the first cache line based on a scope of the first cache line and a saturation metric associated with the target cache, wherein the scope of the first cache line is determined based on lateral persistence tag bits.

Embodiments of the present invention are directed to methods for lateral cache persistence. A non-limiting example computer-implemented method includes receiving a request to evict a first cache line from a first cache on a first microprocessor chip in a plurality of microprocessor chips in a processing drawer, the first cache line having a first set of lateral persistence bits tracking a scope for the first cache line, determining the scope of the first cache line, identifying a target cache having a saturation metric, wherein the target cache comprises a higher scope than the scope of the first cache line, and determining an action for the first cache line based on the saturation metric for the target cache and the scope of the first cache line.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide systems and methods for reducing memory accesses in an SMP environment. Traditionally, reductions in memory accesses are addressed utilizing large caches backing up smaller caches in an N-level vertical cache hierarchy. This includes drawbacks because at a particular cache level, not all the caches are utilized at the same rate. Because not all the caches are being utilized at the same rate, this opens up an opportunity to make use of any under-utilized cache space.

In one or more embodiments of the invention, in an SMP environment, aspects include defining lateral caches that can be used for persisting the cache evictions from a peer lateral cache. These peer lateral caches can be divided into clusters of caches with each cluster signifying a scope of persistence. A cache line that is evicted is allowed to persist, first, within a cluster of peer caches at the next scope of persistence. Then, as the cache line continues to be evicted from a cluster, other clusters can be utilized for storage of the cache line until the evicted cache line reaches a last cluster and can be evicted to main memory. Lateral persistence tag bits can be utilized for tracking the scope of cache persistence for each cache line. In the event of a cache fetch miss, when a cache line is installed for the first time in system caches, the lateral persistence directory tag is set to 0. As the cache line is installed in lateral caches within a cluster or in other clusters of caches, the directory tag is incremented and set to that corresponding scope of persistence where the target cache belongs to. A replacement algorithm/policy is implemented to determine at what level scope the cache line is to be evicted. A target cache is identifying within the scope level and an adaptive LRU (least recently used) replacement policy then determines where to install the cache line in the target cache's congruence class.

Figure 1:
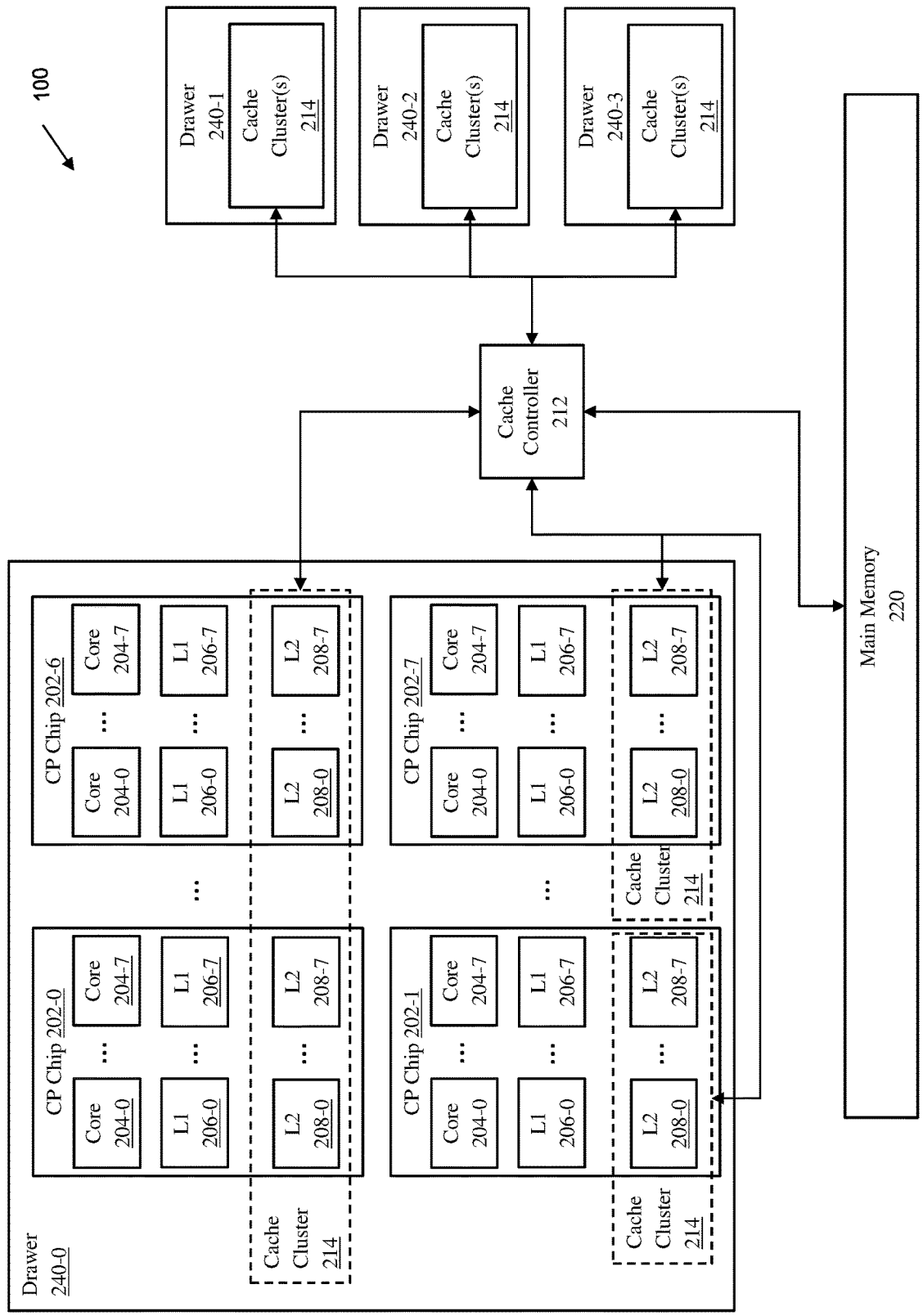
FIG. 1 depicts a block diagram of a distributed symmetric multiprocessing (SMP) system utilizing cache persistence according to one or more embodiments of the invention.

FIG. 1 depicts a distributed symmetric multiprocessing (SMP) system 100 (hereafter "system 100") in accordance with one or more embodiments. System 100 can include 4 processing units or "drawers." Each drawer 240-0, 240-1, 240-2, 240-3 includes eight (8) microprocessor (CP) chips (202-0-202-7). Each CP chip can include eight (8) cores 204-0-204-7. Each core in the CP chip includes a private L1 cache 206-0-206-7 (including both instruction cache and data cache). These private L1 caches are backed by semi-private L2 caches 208-0-208-7. In one or more embodiments of the invention, the semi-private L2 caches 208 can interact to provide an on-chip virtual L3 cache. Each processor drawer 240 contains up to 8 CP chips 202 with a fully connected topology providing a virtual L4 cache. The virtual L3 and virtual L4 caches can be implemented through a set of chip caching technologies that cluster the independent physical L2 caches 208 within a chip 202 and within a drawer 240 to act as a unified shared victim cache.

In one or more embodiments of the invention, the virtual L3/L4 caches are implemented by defining groups/clusters of L2 caches within a CP chip, group of CP chips, and/or drawers for evicting cache lines from peer caches. That is to say, a cache line is evicted from a first L2 to a peer L2 within the defined groups/clusters of L2 caches according to a defined replacement policy described herein.

In one or more embodiments of the invention, peer L2 caches (sometimes referred to as "lateral caches") can be divided into clusters of caches 214 called primary, secondary, and tertiary, which can be extended into an infinite number of unique scopes. When a cache line is evicted from an L2 cache, this evicted cache line is allowed to persist within the cluster of caches 214 passing from one cluster after the other until it reaches a last cluster of caches. In one or more embodiments, lateral persistence (LP) tag bits can be utilized for identifying the scope of the persistence. That is to say, the tag bit can signify what is the current scope of persistence and how many scopes can the cache line hop before it is evicted to memory or re-referenced by a processor cache. In the event of a fetch miss when a cache line is installed for the first time into a system cache, the LP tag bit can be set to 0. And when the same cache line is evicted from the cache, the cache line is persisted in any of the other caches in the next scope of persistence (e.g., primary, secondary, or tertiary) within the lateral persistence tag bits being set to the respective scope of persistence.

In one or more embodiments of the invention, each drawer 240 includes one or more cache clusters 214 that are utilized for persisting cache lines when evicted from a cache within the cluster 214. The illustrative example shows one configuration of the cache clusters 214; however, in one or more embodiments, the clusters 214 can include any number of L2 caches in any type of configuration including across drawer L2 caches in a group/cluster. In one or more embodiments of the invention, wherein the data in the cache is arranged into congruence classes that contain a plurality of cache lines, and said congruence class contains a chronology vector used to determine which entry to evict, cache evictions occur using an adaptive LRU replacement policy. In the absence of an empty compartment for install on a local processor fetch miss, the replacement policy looks to evict a cache line from that L2 cache associated with the processor that is least recently used based on the chronology vector. A target L2 cache can be identified by examining the utilization of the target L2 cache with respect to the processing cores using the target L2 cache and any other metrics for the target L2 cache. The target L2 cache can be selected from among the L2 caches within the cluster 214 by having the lowest utilization of any L2 cache within the cluster of caches 214. The utilization of the cache can be based on a number of factors including, but not limited, total cache accesses within a pre-defined time period, frequency of cache eviction and/or writes, time periods between cache accesses, evictions, and/or writes, the number of lateral persistent cache lines installed within the cache, invalidations from local/remote cores, and the like (these factors may be referred to as a saturation metric). The method to pick the lowest utilized cache can be implemented as the least within the group of counters tracking the activity per cache or it can be implemented as an LRU policy to determine the last used cache within a time window In one or more embodiments of the invention, when a cache line is first evicted to a lateral cache within a cluster of caches, the LP bit can be set to 1 which indicates that the cache line has been evicted from the first cache to the target cache in the cluster of caches that correspond to primary/first scope of persistence. When the same cache line is evicted from the target cache to a new target cache in the next scope of persistence (i.e., secondary castout (SCO)), the LP bit will be set to 2 and so on. When the same cache line is evicted from a target cache, the replacement policy can look to other clusters of caches to write the cache line using the same cache utilization determination within the new cluster of caches. The new cluster of caches can be within the same drawer 240-0 or in other drawers 240-1, 240-2, 240-3 depending on the way the caches are virtually identified/defined as clusters/scopes. In one or more embodiments of the invention, if the cache line is fetched by a processing core 204, the cache line is written to the fetching core's L2 cache and the LP bit can be reset to 0. In one or more embodiments of the invention, the lateral persistence and replacement policy can be implemented using the cache controller 212 to manage cache evictions amongst the clusters of caches 214 and evictions to main memory 220. The cache controller 212 can be local within a drawer 240 or may be a distributed element within an instance per cluster of caches.

In one or more embodiments of the invention, the replacement policy can be preferential for lateral caches 208 on a CP chip 202. A CP chip 202 can have more than one defined cluster of caches 214 as there are eight on the CP chip. The replacement policy can first look to evict cache lines to L2 caches 208 local to a CP chip 202 prior to searching for other L2 caches that may be on other CP chips 202. For example, consider three cache clusters 214 where a first cache cluster/primary scope and a second cache cluster/secondary scope exists on a first CP chip and a third cache cluster/tertiary scope is on a second CP chip. The replacement policy can look at utilization rates for the L2 caches within the first cache cluster which includes the cache that is evicting the cache line. This can be defined as the first scope of persistence. The first scope of persistence looks within the first cache cluster where the evicting cache exists. A second scope of persistence can be defined as any other group (e.g., the second cache cluster) that is on the CP chip where the evicting cache does not reside, but may not include the entire system. The third scope of persistence can look to groups on other CP chips within the drawer. The utilization of each L2 cache 208 within a cache cluster 214 can be analyzed for determining the target cache to persist the cache eviction. On a further eviction of the same cache line from the target cache on primary cluster, the replacement policy then tries to pick a cache from the secondary cluster for the castout to persist using the same prior utilization analysis. On the following castout from the last scope, the line would be written to memory if changed or else just dropped. In the absence of an empty compartment in the target cache, a persistence install might cause a castout in the target lateral cache (cascading castout), where the cascading castout is sent for persistence in the following scope until an empty compartment is available at the next scope or the chain of castouts reaches the last scope of persistence. The processor can decide to bypass all the cascading castouts to memory under certain utilization thresholds or contention in the system Several utilization thresholds can be used for determining whether to keep the cache eviction within a certain level of scope. For example, if the utilization rate for the caches in the first cache cluster is higher than a first threshold, then the replacement policy looks to the second cache cluster on the same CP chip for evicting the cache line. If the utilization rate of the L2 caches in the second cache cluster is also higher than the first threshold utilization rate, then the replacement policy looks to the third cache cluster on a different CP chip and so on and so forth.

In one or more embodiments of the invention, the replacement policy executed by the cache controller 212 can determine a target cache for an evicted cache line by keeping a counter ("saturation counter") for each cache in the system 200. The counter can track a saturation metric for each cache 208 in the system 200. Initially, cache lines can be persisted by searching for target caches within the home cache cluster 214 of the cache line being evicted. The counter for each cache 208 can be used to track saturation metrics of the cache. This saturation metric (i.e., utilization) can include the number of installs in a cache from the core/cores attached to it (fetch misses), the number of installs of cast-outs from lateral caches (peer cache), etc. where the counter increments per install event. This counter provides a metric for the combined activity of the cores attached to the caches and the cast-outs the cache has received from peer lateral caches. In the event of a cache eviction from a cache, the cache line is sent to persist in a lateral cache with the lowest saturation counter value or a lateral cache with a saturation counter value less than the first cache doing the eviction or broadcast to a group of less active caches so that the less busy cache (at the time of eviction) accepts the cache line.

Figure 2:
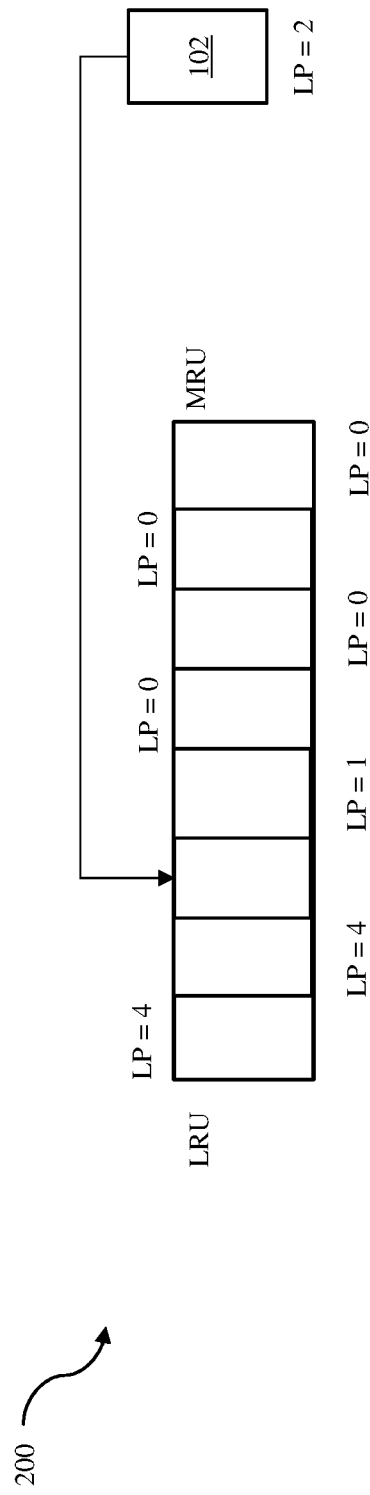
FIG. 2 depicts a block diagram of an exemplary target cache according to one or more embodiments of the invention.

In one or more embodiments of the invention, the replacement policy determines a target cache for a cache eviction based on the LP bits for the cache line being evicted and the utilization of the lateral caches. Once a target cache is determined, the replacement policy further is utilized to determine where to place the cache line within the target cache. FIG. 2 depicts a block diagram of an exemplary target cache according to one or more embodiments of the invention. The exemplary target cache 200 is an 8-way cache which can store 8 cache lines. The exemplary cache 200 utilizes an adaptive least recently used (LRU) algorithm for managing the cache lines within the cache 200. LRU is a cache replacement algorithm that discards the least recently used cache line first whenever there is a need to write to the cache 200. The LRU algorithm supports multiple install positions including MRU, Mid-LRU, quarter-LRU, LRU and any partial install position in-between. Also, the LP tag bits can be used to discern the lines installed directly by the local processor versus the lateral castouts by peer caches from any scope. Scanning a given congruence class gives a gauge for activity distribution between the core/cores attached to the cache 200 and the castouts it has received from the lateral caches. At the time of install, all the castouts persisted from lateral caches get a partial placement in the LRU tree initially. All the lines installed by local processor fetches would get an MRU placement. Once the percentage of lines installed by lateral castouts crosses a threshold of total capacity of the congruence class, the newly persisted entries get a larger partial/MRU placement. The larger partial and partial placements can be configured based on the workload needs. This adaptive LRU placement policy dynamically accommodates the caches to contain more local installs and locally re-referenced lines when the local processor is active and more persisted entries when the local processor is dormant. For example, if the minimum capacity threshold for persisted entries in a cache was set to 50%, the persisted entries would get partial placement until the number of persisted entries (including the current install 102) in the congruence class are less than 50% of congruence class capacity. Thereafter, they get a larger partial/MRU placement. In the illustrated example, with threshold set to 75%, the current install cache line 102 is a persisted install (LP greater than 0), and the total persisted installs are 4. So line 102 would still get a partial MRU placement. Once the persisted installs are 6, the about to be persisted install would get an MRU placement.

In one or more embodiments of the invention, the determined utilization rate of a target cache can dictate how a cache line is installed and how many peer cache lines can be installed within the target cache. For example, if the target cache has a very low utilization rate (e.g., is less than a pre-defined threshold), then the target cache can have most, if not all, lateral cache lines installed within the target cache. Multiple threshold utilization rates can be defined which dictate how many peer cache lines can be installed. The number of cache lines can be defined by a percentage of the memory available (50%, 75%, etc. of the cache memory) or a number.

In one or more embodiments of the invention, cache clusters 214 can be defined using a variety of means such as, for example, selecting a number of caches within a CP chip 202, selecting a number of caches within a drawer 240, and/or selecting a number of caches across drawers 240. Defining the cache clusters in the system can be done based on the locality of peer caches like taking the data sourcing latency into effect and/or workload dispatch patterns and/or OS/software directive hints. Scopes/cache clusters can be changed over time based on hypervisor hints and/or processor types attached to a cache and/or including the directives mentioned above. Also, not all clusters have the same number of L2 caches.

Figure 3:
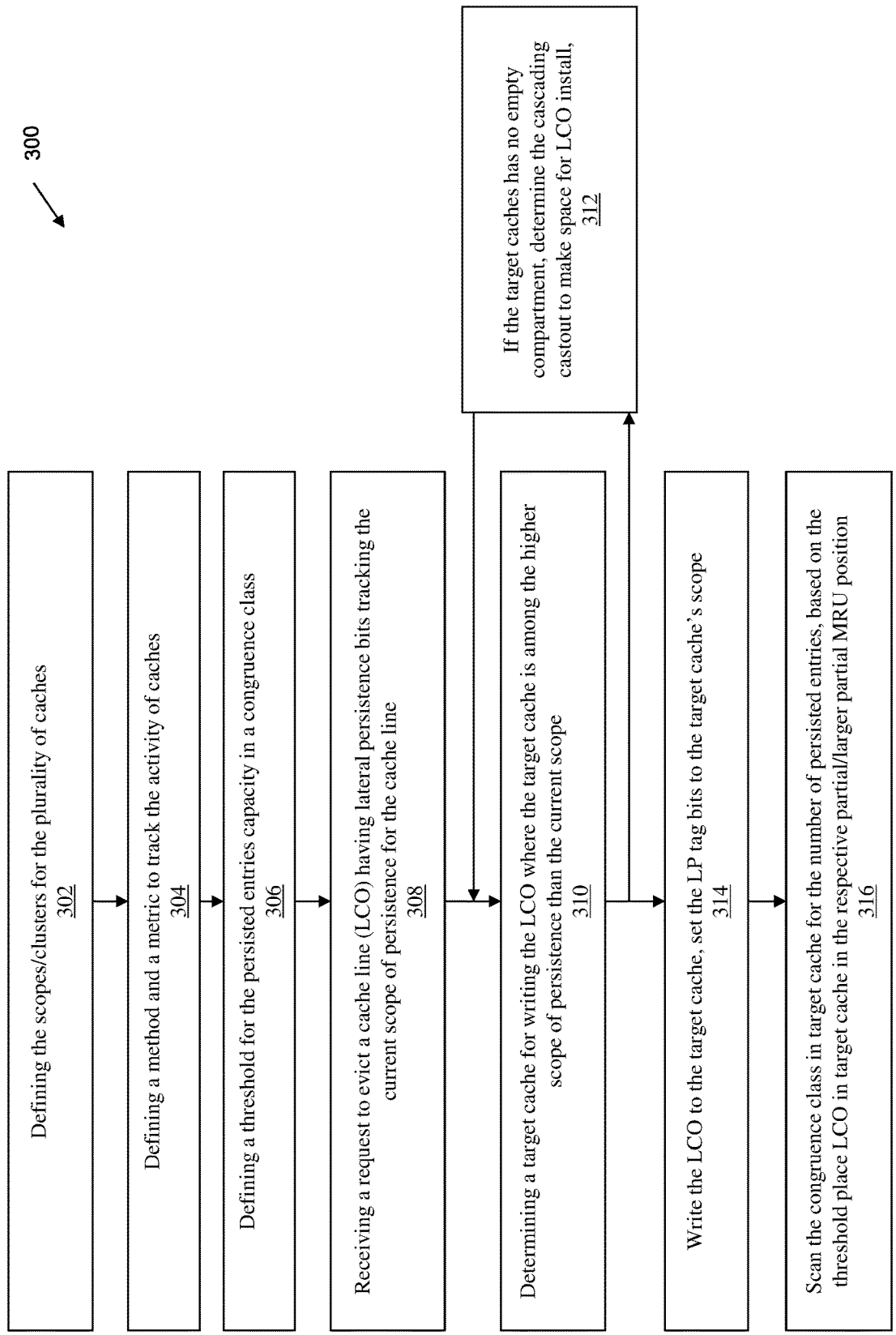
FIG. 3 depicts a flow diagram of a method for lateral cache persistence according to one or more embodiments of the invention.

FIG. 3 depicts a flow diagram of a method 300 for lateral cache persistence according to one or more embodiments of the invention. At least a portion of the method 300 can be executed, for example, by the processor 601 shown in FIG. 6. The method 300 includes defining scopes and/or clusters for a plurality of caches in a symmetrical multiprocessing (SMP) system, as shown in block 302. This includes having a data processing system including several processor units, wherein each processor unit contains a processor with an associated upper and lower-level cache (L2), coupled together by an interconnect fabric. The data in the cache is arranged into congruence classes that contain a number of cache lines, and theses congruence classes also include a chronology vector used to determine which entry to evict. The chronology vector (age bit) tracks the age of the cache line in the cache. The clusters of caches are arranged into a plurality of scope domains, called primary, secondary, and tertiary, which can be extended into an infinite number of unique scopes. In the event of a cache eviction and a cache has been determined to be evicted, the processing cache determines if the entry should be laterally castout (LCO) to a peer cache within a primary castout scope (PCO), a secondary castout scope (SCO), or written back to memory as a tertiary castout (TCO). At block 304, the method 300 includes defining both a methodology and a metric to track the activity of the caches in the system. Upon determining which cache line to evict, the processing cache determines if the entry should be laterally castout (LCO) to a peer cache within a primary castout scope (PCO), a secondary castout scope (SCO), written back to memory as a tertiary castout (TCO). Within each of the target scope, the activity of the caches are tracked using a saturation counter that tracks the number of installs as defined by processor misses into each cache. At block 306, the method 300 includes defining a threshold for the persisted entries capacity within a congruence class. Installed cache lines for a given cache can be tracked by various requester types such, for example, a local processor fetch versus a lateral castout from another cache. The install position of a cache line can be based on the percentage of lines installed by processor fetches versus lateral castouts. When the cache line is installed in the cache on a lateral castout, the cache line is placed in a non-MRU (most recently used) position initially. Once the percentage of cache lines installed by lateral castouts crosses a predefined threshold of the total capacity of the congruence class, the persisted cache entries get a larger partial/MRU placement. At block 308, the method 300 includes receiving a request to evict a cache line (LCO) having lateral persistence bits tracking the current scope of persistence for the cache line. The current scope of a cache line is determined using the lateral persistence tag bits which are set to zero when the line is installed or re-referenced by a processor and incremented every time a line is evicted from a current cache and persisted in any of the caches at the next scope.

In one or more embodiments of the invention, the method 300, at block 310, includes determining a target cache for writing the LCO where the target cache is among the higher scope of persistence than the current scope. The current scope is determined based on the activity of the caches using counters that track the number of installs as defined by processor misses into each cache and least active cache is picked as a target to persist the castout. The castout can be sent to a group of less active caches. The counters track the number of invalidations from local and/or remote cores, the number of lateral castout installs, and the number of total castouts (as defined by local evictions and/or invalidations from local/remote cores and/or peer cache evictions). The counters can be implemented as an LRU tree algorithm, for example. In one or more embodiments of the invention, the method 300 includes decision block 312 which includes determining if the target cache has no empty compartments for an install and then determining the cascading castout methodology for making space for the LCO install. That is to say, the evicted entry being sent for persisting might cause a castout in the target lateral cache in the absence of an empty compartment. In this case, a cascading castout is sent for persistence in the following group until an empty compartment is available at the next scope and/or the chain of castouts reaches the last scope of persistence. In that case, if the replacement algorithm decides the system is under contention/busy, the cascading castouts are bypassed to main memory. Once a target cache is determined with or without cascading and the cache line is not written to memory, the method 300 includes writing the LCO to the target cache and setting the LP tag bits to the target cache's scope, as shown in block 314. And at block 316, the method 300 includes scanning the congruence class of the target cache for the number of persisted entries and based on the threshold, place the LCO in the target cache in the respective partial/larger partial MRU position. The chronology vector includes a cache replacement algorithm that supports multiple install positions including MRU, Mid-LRU, LRU, and any partial install position in-between. As the percentage of lines installed in lateral castouts crosses a threshold of the capacity of the congruence class, the persisted entries get a larger partial/MRU placement.

Additional processes may also be included. It should be understood that the processes depicted in FIG. 3 represent an illustrations and that other processes may be added or existing processes may be removed, modified, or rearranged without departing from the scope and spirit of the present disclosure.

Figure 4:
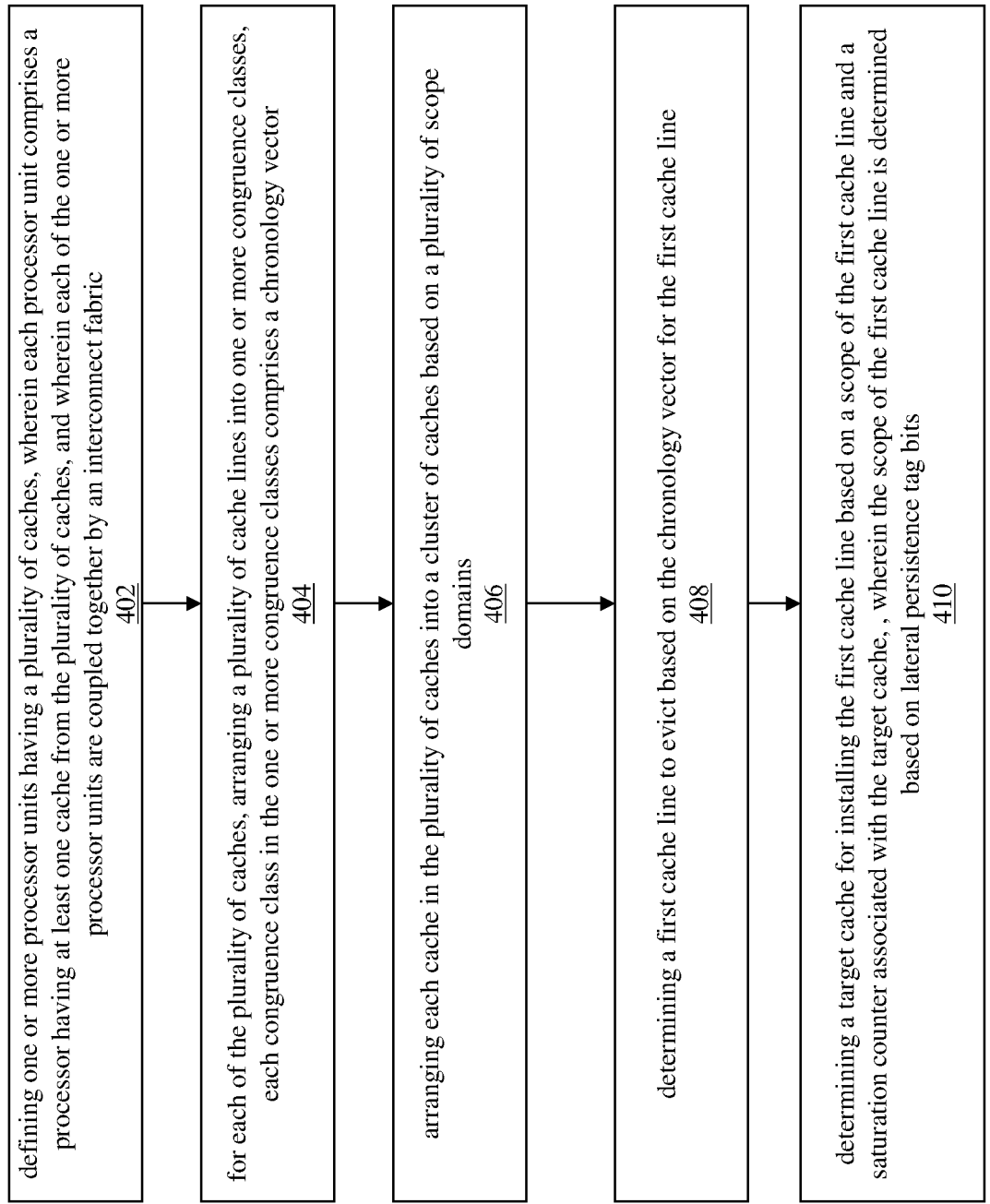
FIG. 4 depicts a flow diagram of a method for lateral cache persistence according to one or more embodiments of the invention.

FIG. 4 depicts a flow diagram of a method 400 for lateral cache persistence according to one or more embodiments of the invention. At least a portion of the method 400 can be executed, for example, by the processor 601 shown in FIG. 6. The method 400 includes defining one or more processor units having a plurality of caches, wherein each processor unit comprises a processor having at least one cache from the plurality of caches, and wherein each of the one or more processor units are coupled together by an interconnect fabric, as shown in block 402. At block 404, the method 400 includes for each of the plurality of caches, arranging a plurality of cache lines into one or more congruence classes, each congruence class in the one or more congruence classes comprises a chronology vector. Then, the method 400 includes arranging each cache in the plurality of caches into a cluster of caches based on a plurality of scope domains, as shown at block 406. Also, at block 408, the method 400 includes determining a first cache line to evict based on the chronology vector for the first cache line. And, at block 410, the method 400 includes determining a target cache for installing the first cache line based on a scope of the first cache line and a saturation metric associated with the target cache, wherein the scope of the first cache line is determined based on lateral persistence tag bits.

Additional processes may also be included. It should be understood that the processes depicted in FIG. 4 represent an illustrations and that other processes may be added or existing processes may be removed, modified, or rearranged without departing from the scope and spirit of the present disclosure.

Figure 5:
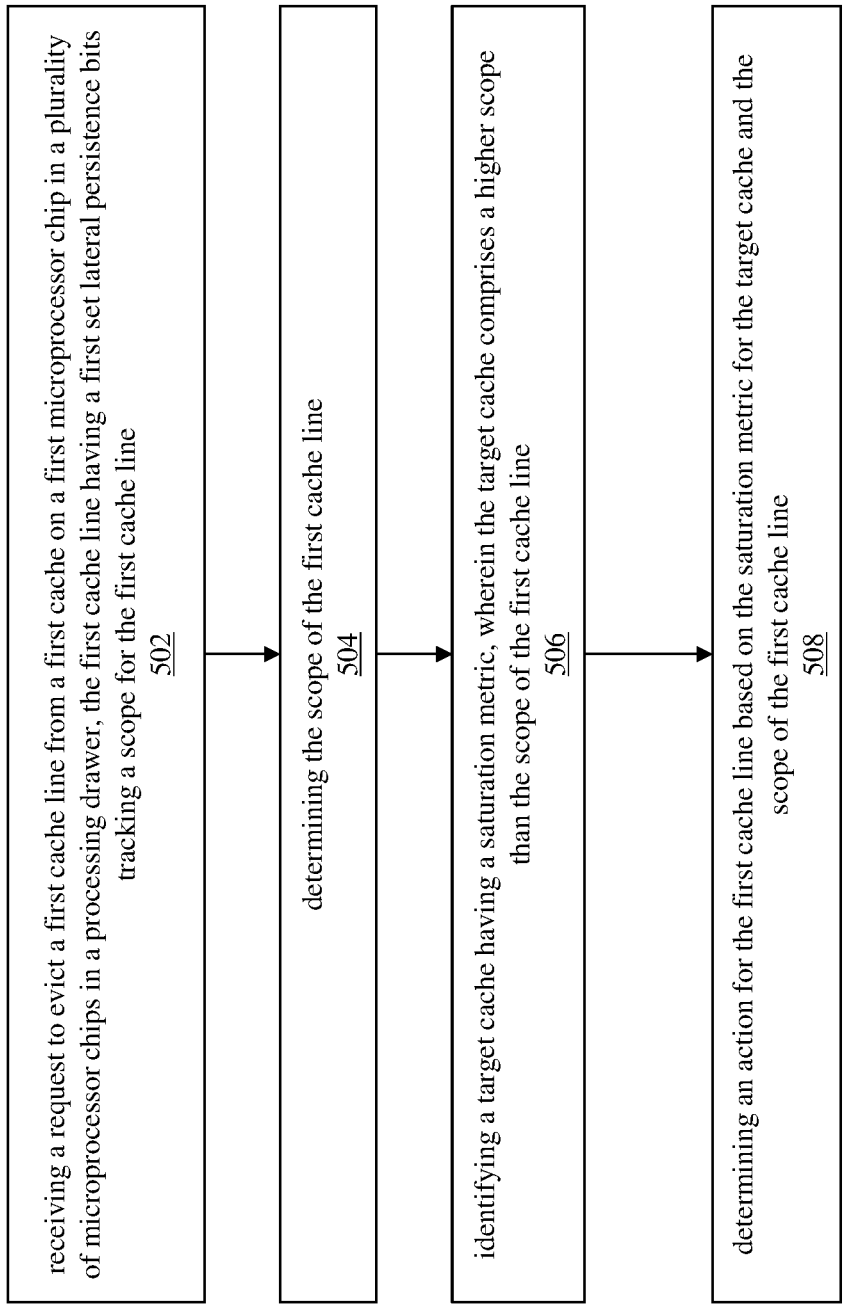
FIG. 5 depicts a flow diagram of a method for lateral cache persistence according to one or more embodiments of the invention.

FIG. 5 depicts a flow diagram of a method 500 for lateral cache persistence according to one or more embodiments of the invention. At least a portion of the method 500 can be executed, for example, by the processor 601 shown in FIG. 6. The method 500 includes receiving a request to evict a first cache line from a first cache on a first microprocessor chip in a plurality of microprocessor chips in a processing drawer, the first cache line having a first set of lateral persistence bits tracking a scope for the first cache line, as shown at block 502. At block 504, the method 500 includes determining the scope of the first cache line. Also, the method 500, at block 506, includes identifying a target cache having a saturation metric, wherein the target cache comprises a higher scope than the scope of the first cache line. And at block 508, the method 500 includes determining an action for the first cache line based on the saturation metric for the target cache and the scope of the first cache line.

Additional processes may also be included. It should be understood that the processes depicted in FIG. 5 represent an illustration, and that other processes may be added or existing processes may be removed, modified, or rearranged without departing from the scope and spirit of the present disclosure.

Figure 6:
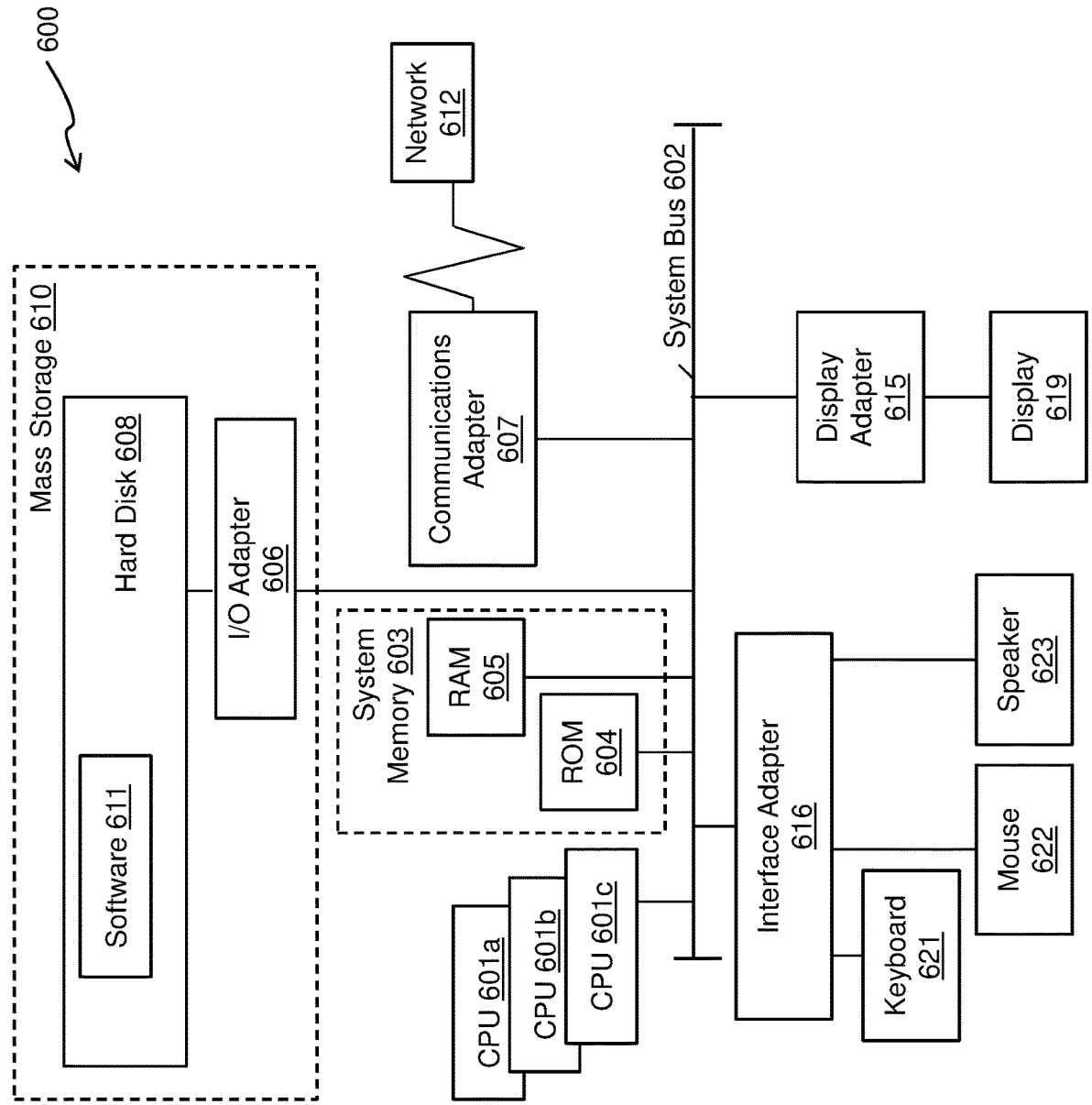
FIG. 6 depicts a block diagram of a computer system in accordance with one or more embodiments of the present invention.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
defining one or more processor units having a plurality of caches, wherein each processor unit comprises a processor having at least one cache from the plurality of caches, and wherein each of the one or more processor units are coupled together by an interconnect fabric;
for each of the plurality of caches, arranging a plurality of cache lines into one or more congruence classes, each congruence class in the one or more congruence classes comprises a chronology vector;
arranging each cache in the plurality of caches into a cluster of caches based on a plurality of scope domains;
determining a first cache line to evict based on the chronology vector for the first cache line; and
determining a target cache for installing the first cache line based on a scope of the first cache line and a saturation metric associated with the target cache, wherein the scope of the first cache line is determined based on lateral persistence tag bits.

2. The computer-implemented method of claim 1, further comprising writing the first cache line to the target cache and incrementing the lateral persistence tag bits for the first cache line.

3. The computer-implemented method of claim 2, wherein writing the first cache line to the target cache comprises:

selecting a second cache line to evict from the target cache;
determining a second scope for the second cache line; and
determining an eviction location for the second cache line based on the second scope, wherein the eviction location comprises at least one of a lateral cache and a main memory.

4. The computer-implemented method of claim 2, wherein writing the first cache line to the target cache comprises:
determining a cache replacement policy comprising one or more cache install positions;
determining a scope for the first cache line for the target cache, wherein the scope determines an originator of a request to install the first cache line, and wherein the originator comprises at least one of a processor local to the target cache and a lateral cache; and
determining an install position of the first cache line based on a percentage of cache lines installed by the processor local to the target cache and a percentage of cache lines installed by lateral caches.

5. The computer-implemented method of claim 4, wherein the one or more cache install positions comprise most recently used (MRU) position, middle least recently used (mid-LRU) position, and least recently used (LRU) position.

6. The computer-implemented method of claim 1, wherein determining the target cache for installing the first cache line comprises:
determining a target cluster of caches based on the scope of the first cache line; and
selecting the target cache from the target cluster of caches.

7. The computer-implemented method of claim 6, wherein determining the target cluster of caches based on the scope of the first cache line and a saturation metric associated with the target cache comprises:
determining a scope domain for each cluster of caches; and
selecting the target cluster of caches based on a scope domain for the target cluster being higher than the scope of the first cache line.

8. The computer-implemented method of claim 6, wherein determining the target cluster of caches based on the scope of the first cache line and a saturation metric associated with the target cache comprises:
analyzing a combined saturation metric for each cluster of caches, wherein the combined saturation metric comprises the saturation metric combined for each cache in a cluster of caches; and
selecting the target cluster of caches based on the combined saturation metric for the target cluster being a lowest combined saturation metric among each cluster of caches.

9. The computer-implemented method of claim 6, wherein selecting the target cache from the target cluster of caches comprises:
analyzing a saturation metric of each cache in the target cluster of caches;
selecting the target cache based on the saturation metric for the target cache being a lowest saturation metric among each cache in the target cluster of caches.

10. The computer-implemented method of claim 1, wherein the saturation metric comprises at least one of a number of installs defined by processor misses and a number of installs in a cache from lateral caches.

11. A computer-implemented method comprising:
receiving a request to evict a first cache line from a first cache on a first microprocessor chip in a plurality of microprocessor chips in a processing drawer, the first cache line having a first set of lateral persistence bits tracking a scope for the first cache line;
determining the scope of the first cache line;
identifying a target cache having a saturation metric, wherein the target cache comprises a higher scope than the scope of the first cache line; and
determining an action for the first cache line based on the saturation metric for the target cache and the scope of the first cache line.

12. The computer-implemented method of claim 11, wherein the action comprises writing the first cache line to the target cache and incrementing the first set of lateral persistence bits.

13. The computer-implemented method of claim 11, wherein the action comprises rejecting the first cache line for the target cache.

14. A system comprising:
one or more processor units having a plurality of caches, wherein each processor unit comprises a processor having at least one cache from the plurality of caches, and wherein each of the one or more processor units are coupled together by an interconnect fabric, and a cache controller configured to perform:
for each of the plurality of caches, arranging a plurality of cache lines into one or more congruence classes, each congruence class in the one or more congruence classes comprises a chronology vector;
arranging each cache in the plurality of caches into a cluster of caches based on a plurality of scope domains;
determining a first cache line to evict based on the chronology vector for the cache line; and
determining a target cache for installing the first cache line based on a scope of the first cache line and a saturation metric associated with the target cache, wherein the scope of the first cache line is determined based on lateral persistence tag bits.

15. The system of claim 14, wherein the cache controller is further configured to perform writing the first cache line to the target cache and incrementing the first lateral persistence bit tags for the first cache line.

16. The system of claim 15, wherein writing the first cache line to the target cache comprises:
selecting a second cache line to evict from the target cache;
determining a second scope for the second cache line; and
determining an eviction location for the second cache line based on the second scope, wherein the eviction location comprises at least one of a lateral cache and a main memory.

17. The system of claim 15, wherein writing the first cache line to the target cache comprises:
determining a cache replacement policy comprising one or more cache install positions;
determining an originator of a request to install the first cache line to the target cache, wherein the originator comprises at least one of a processor local to the target cache and a lateral cache; and
determining an install position of the first cache line based on a percentage of cache lines installed by the processor local to the target cache and a percentage of cache lines installed by lateral caches.

18. The system of claim 14, wherein determining the target cache for installing the first cache line comprises:
- determining a target cluster of caches based on the scope of the first cache line; and
- selecting the target cache from the target cluster of caches.

19. A computer program product comprising a computer readable storage medium having program instructions embodied therewith, the program instructions executable by one or more processors to cause the one or more processors to perform operations comprising:
- defining one or more processor units having a plurality of caches, wherein each processor unit comprises a processor having at least one cache from the plurality of caches, and wherein each of the one or more processor units are coupled together by an interconnect fabric;
- for each of the plurality of caches, arranging a plurality of cache lines into one or more congruence classes, each congruence class in the one or more congruence classes comprises a chronology vector;
- arranging each cache in the plurality of caches into a cluster of caches based on a plurality of scope domains;
- determining a first cache line to evict based on the chronology vector for the first cache line; and
- determining a target cache for installing the first cache line based on a scope of the first cache line and a saturation metric associated with the target cache, wherein the scope of the first cache line is determined based on lateral persistence tag bits.

20. The computer program product of claim 19, further comprising writing the first cache line to the target cache and incrementing the first lateral persistence bit bits for the first cache line.

21. The computer program product of claim 20, wherein writing the first cache line to the target cache comprises:
- selecting a second cache line to evict from the target cache;
- determining a second scope for the second cache line; and
- determining an eviction location for the second cache line based on the second scope, wherein the eviction location comprises at least one of a lateral cache and a main memory.

22. The computer program product of claim 20, wherein writing the first cache line to the target cache comprises:
- determining a cache replacement policy comprising one or more cache install positions;
- determining an originator of a request to install the first cache line to the target cache, wherein the originator comprises at least one of a processor local to the target cache and a lateral cache; and
- determining an install position of the first cache line based on a percentage of cache lines installed by the processor local to the target cache and a percentage of cache lines installed by lateral caches.

23. A computer program product comprising a computer readable storage medium having program instructions embodied therewith, the program instructions executable by one or more processors to cause the one or more processors to perform operations comprising:
- receiving a request to evict a first cache line from a first cache on a first microprocessor chip in a plurality of microprocessor chips in a processing drawer, the first cache line having a first set of lateral persistence bits tracking a scope for the first cache line;
- identifying a target cache having a saturation metric;
- determining the scope of the first cache line; and
- determining an action for the first cache line based on the saturation metric for the target cache and the scope of the first cache line.

24. The computer program product of claim 23, wherein the action comprises writing the first cache line to the target cache and incrementing the first set of lateral persistence bits.

25. The computer program product of claim 23, wherein the action comprises rejecting the first cache line for the target cache.

* * * * *